Figure 1B:
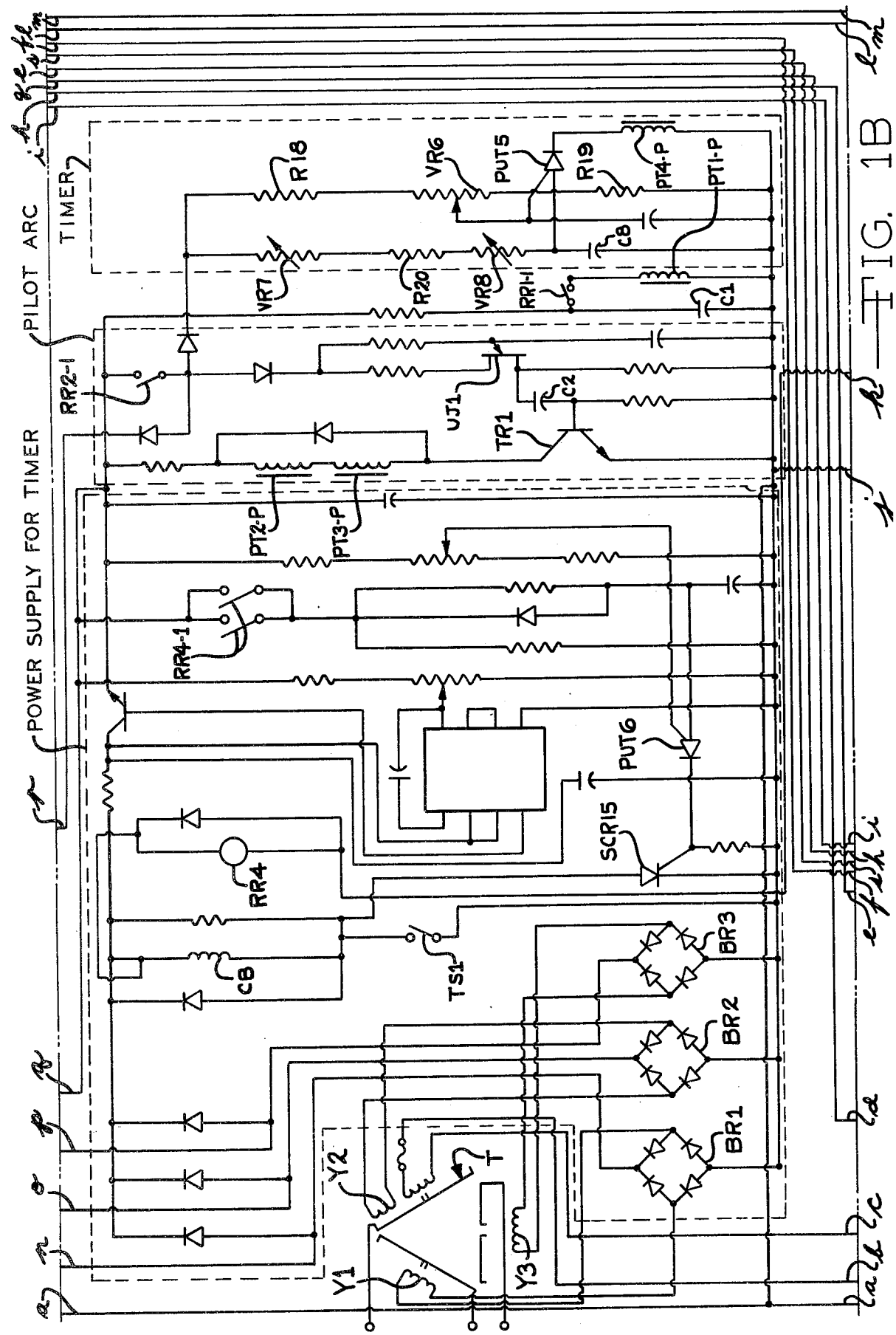

United States Patent [19]

Glorioso

[11] 4,031,349
[45] June 21, 1977

[54] STUD WELDING CONTROL

[75] Inventor: Paul A. Glorioso, Amherst, Ohio

[73] Assignee: TRW Inc., Cleveland, Ohio

[22] Filed: Sept. 19, 1975

[21] Appl. No.: 614,841

[52] U.S. Cl. ............................................. 219/98
[51] Int. Cl.² ....................................... B23K 9/20
[58] Field of Search .......... 219/98, 99, 135, 131 R;
323/22 SC

[56] References Cited

UNITED STATES PATENTS

| | | | |
|---|---|---|---|
| 3,162,747 | 12/1964 | Netzsch | 219/98 |
| 3,183,372 | 5/1965 | Chin | 323/22 SC |
| 3,371,242 | 2/1968 | Aldenhoff et al. | 219/135 |
| 3,526,742 | 9/1970 | Hill | 219/98 |
| 3,530,359 | 9/1970 | Grist | 219/135 |
| 3,562,485 | 2/1971 | Glorioso | 219/98 |
| 3,597,580 | 8/1971 | Stearns et al. | 219/135 |
| 3,781,640 | 12/1973 | Toth | 219/131 R |
| 3,826,893 | 7/1974 | Glorioso | 219/98 |

Primary Examiner—Bruce A. Reynolds
Assistant Examiner—Clifford C. Shaw
Attorney, Agent, or Firm—Allen D. Gutchess, Jr.

[57] ABSTRACT

Controls for use in end welding a stud to a workpiece by a drawn-arc technique are set forth. In welding a stud to a workpiece, an end of the stud is placed against the workpiece and is then retracted as a pilot arc is established between the stud and the workpiece. A welding arc is then superimposed on the pilot arc which causes portions of the stud and the workpiece to become molten. These portions join and solidify to securely weld the stud to the workpiece when the stud is plunged back to engage the workpiece. The controls include a timer dial on a control panel of the welding apparatus for setting the length of time of the welding arc, and a current dial on the control panel to set the current of the welding arc. Particularly for the control of the current, a unique circuit enables a desired current to be maintained even though the line voltage and the length of the welding cable vary over a wide range. The controls are accurate enough that the dials for the time and current can be set to recommended settings for a particular size of stud and effective welds will be achieved without any experimentation, assuming the amount of lift and plunge of the tool are also properly set.

8 Claims, 3 Drawing Figures

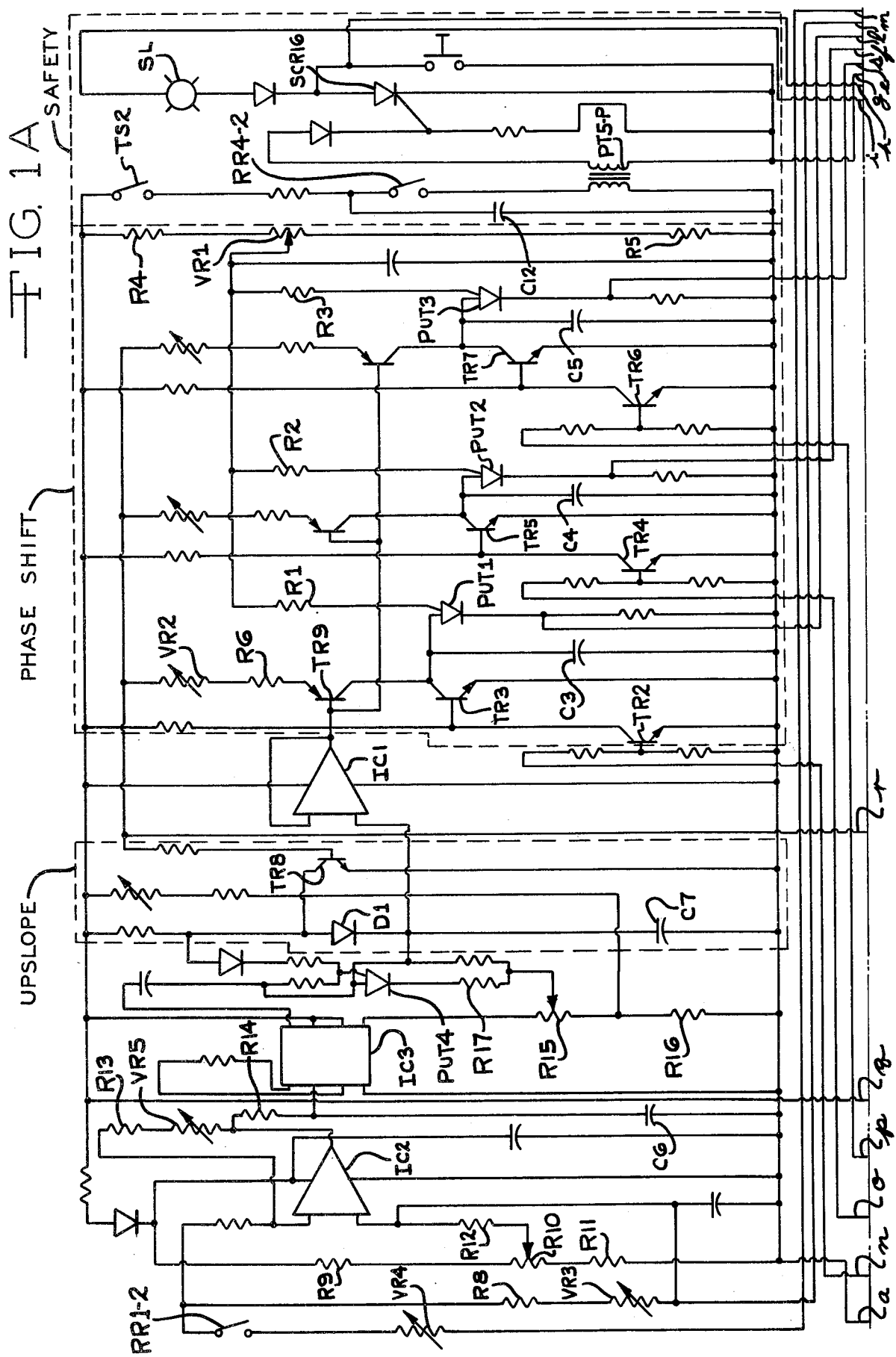

STUD WELDING CONTROL

This invention relates to stud welding and particularly to controls for stud welding apparatus.

The instant invention provides controls for welding studs to workpieces, which controls are more accurate and capable of being used over a wider range of variables than controls heretofore known. The new controls are sufficiently accurate that the welding time and the welding current can simply be set on dials of the control panel according to recommendations for a particular size stud. With the dials set, effective initial welds are thereby assured, assuming the lift and plunge of the tool are properly set, without the need for further experimentation. In addition, the weld current is maintained at the selected level even when wide ranges of line voltage and wide variations in the length of the welding cable are encountered. The current control basically includes a shunt producing a feedback signal which is compared with a standard signal through integrated circuits and the welding current is then controlled by phase shifting.

It is, therefore, a principal object of the invention to provide more accurate stud welding controls than heretofore known.

Another object of the invention is to provide controls for time and current for stud welding which are sufficiently accurate that studs can be immediately welded with assured results with the recommended values set on the stud welding control dials.

Still another object of the invention is to provide controls for stud welding which maintain a selected weld current even with widely varying line voltage and welding cable lengths.

Figure 1C:
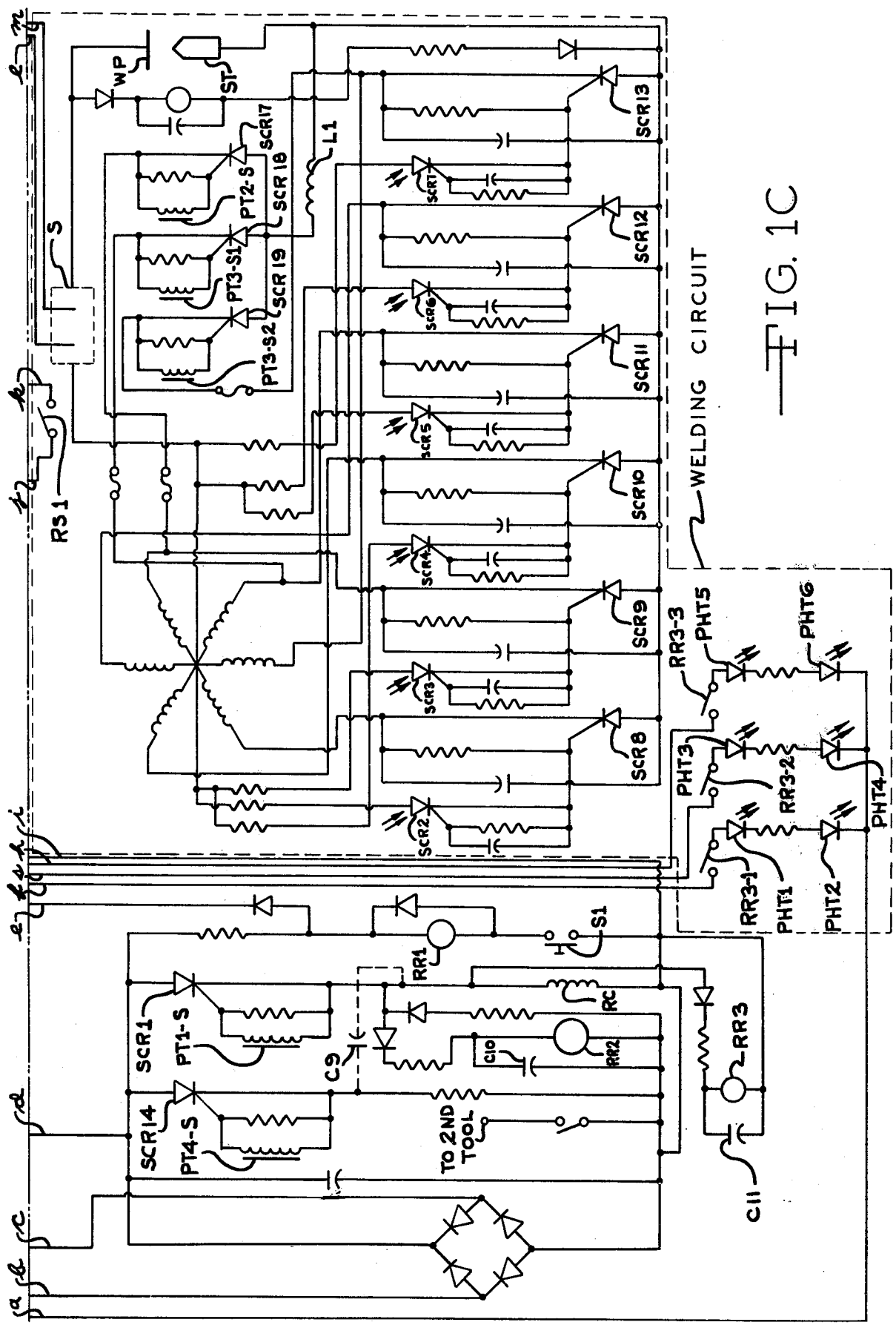

Many other objects and advantages of the invention will be apparent from the following detailed description of a preferred embodiment thereof, reference being made to the accompanying drawings, in which:

FIGS. 1A, 1B, and 1C are diagrammatic views of a circuit embodying controls in accordance with the invention.

The circuit of the drawings is designed for use with a welding tool to weld a stud to a workpiece by an end-welding, drawn-arc technique. A tool of this nature includes an electrical retraction coil which retracts a stud carried by a chuck from a surface of a workpiece, with the stud then being held in the retracted position as long as the coil is energized. The tool also includes a plunge spring for moving the stud toward and against the workpiece when the coil is deenergized. As the stud is retracted, a pilot arc is formed and, subsequently, a main welding arc is imposed on the pilot arc between the stud and the workpiece. This main welding arc melts a portion of the stud end and a portion of the adjacent workpiece, with the molten metal portions then joining and solidifying as the stud engages the workpiece upon completion of the plunge stroke, to provide a secure weld between them.

Under actual conditions, the circuit controls have been found to maintain weld current within ± 3% of the current dial setting on the control panel even with the line voltage varying from 423 to 490 volts and with a No. 4/0 welding cable varying from 82 to 332 feet in length. The dial accuracy for the welding time control was ± 0.05 second.

In the drawings, certain circuit portions performing specific functions are indicated accordingly in dotted lines. Also, corresponding conductors or lines shown in two or more Figures are designated with the same letter.

Referring to the drawings, and particularly FIG. 1C, when a welding tool trigger switch S1 is closed by an operator, a retraction coil RC of the welding tool, which lifts the chuck and stud, is energized. This is accomplished through a reed relay RR1, which closes its normally open contacts RR1-1 to pulse a primary PT1-P (FIG. 1B) of a pulse transformer by means of a capacitor C1. A secondary PT1-S (FIG. 1C) is likewise pulsed which energizes a silicon-controlled rectifier SCR1 to energize the retraction coil RC as well as second and third reed relays RR2 and RR3.

The reed relay RR2 closes its normal-open contacts RR2-1 (FIG. 1B) to energize an oscillator circuit for the pilot arc. A unijunction transistor UJ1 is energized through the contacts RR2-1 with a pulse from this transistor driving a transistor TR1 with the pulse being coupled through a capacitor C2. The transistor TR1 also excites pulse transformer primaries PT2-P and PT3-P. Their secondaries PT2-S, PT3-S1, and PT3-S2 pulse silicon-controlled rectifiers SCR17, SCR18, and SCR19 (FIG. 1C) to provide half wave current through an inductance L1 to establish a pilot arc across a stud ST and a workpiece WP.

The first reed relay RR1 also energizes a timer circuit, to be discussed subsequently, and also a phase shift circuit (FIG. 1A) and an up-slope circuit. Contacts RR1-2 of the reed relay RR1 also connect a control dial on the control panel to the circuit for the appropriate welding tool being used when two are employed. With a single welding tool, the contacts RR1-2 are not needed, which is also true of certain other components of the circuitry.

When the reed relay coil RR3 was energized, it closed contacts RR3-1, RR3-2, and RR3-3 (FIG. 1C) which completed a circuit from the output of the phase shift circuit to light-emitting diodes PHT1–PHT6. When these are pulsed, they turn on light-activated SCRs designated SCR2–SCR7 (which could be replaced by pulse transformers). These fire SCRs designated SCR8–SCR13 which turn on when their anode power supply is positive, being phase shifted from the phase shift circuit. These control the main welding current.

The phase shift circuit (FIG. 1A) consists of three identical parts, each including a programmable unijunction transistor and specifically unijunction timers or oscillators designated PUT1, PUT2, and PUT3. Gate references for each of these are set to fixed voltages through resistors R1, R2, and R3, through a voltage divider including resistors R4, R5, and a variable resistor VR1.

Each of capacitors C3, C4, and C5 associated with the three programmable unijunction transistors is charged through a constant current source comprising a resistor R6, a variable resistor VR2, and a transistor TR9 for the capacitor C3, with the capacitors C4 and C5 having corresponding, unnumbered sources. The current which charges the capacitors C3, C4, and C5 is governed by a control voltage supplied by an integrated circuit IC1 which is an operational amplifier and which constitutes a voltage follower in the manner in which it is wired into the circuit. The charging time of the three capacitors C3, C4, and C5 is inversely controlled by the output of the integrated circuit IC1. Thus, with a low output from IC1, charging current is high and the capacitors C3–C5 are charged faster. When the charges reach the bias or firing voltages of the programmable unijunction transistors PUT1–PUT3, they fire and pulse the photon couplers consisting of the light-emitting diodes PHT1–PHT6 and the SCRs SCR2–SCR7. Hence, with a low output from IC1 and higher charging currents for the capacitors C3–C5, the welding current is turned on sooner.

Transistors TR2, TR3; TR4, TR5; and TR6, TR7 comprise flip-flop circuits. They reset the capacitors C3–C5 and the programmable unijunction transistors PUT1–PUT3 by discharging the capacitors C3–C5 prior to each half cycle of each phase of the main line voltage. The signals to accomplish this come from unfiltered bridge rectifiers BR1, BR2, and BR3 (FIG. 1B) which obtain voltage from reference windings designated Y1, Y2, and Y3 of the main welding transformer designated T. For example, when the voltage from the bridge BR1 crosses zero, the transistor TR2 turns off and TR3 turns on. When the voltage is past zero, the conditions of the transistors reverse to the original, with the capacitor C3 being discharged at that time. The other two capacitors are controlled by their respective flip-flops in the same manner.

Control signals are developed across a shunt designated S (FIG. 1C) in the main welding circuit. The voltage developed across the shunt is supplied to a voltage divider consisting of a resistor R8 (FIG. 1A) and variable resistors VR3 and VR4. The latter is manipulated by the dial on the control panel for the current control. A signal from the divider is supplied to an amplifying integrated circuit IC2. Bias and offsetting resistors R9, R10, R11, and R12, a gain-setting resistor R13, and avariable resistor VR5 are connected in circuit with the integrated circuit IC2. The output of the integrated circuit IC2 is integrated through a resistor R14 and a capacitor C6. Voltage at the capacitor C6 is compared by an integrated circuit IC3 with a reference voltage, an internal reference in this instance. If the voltage is greater than the reference, the integrated circuit IC3 reduces its output signal and vice versa. The output signal is applied across a voltage divider comprising resistors R15 and R16 to raise or lower the voltage on a slope capacitor C7, which is applied to the voltage follower integrated circuit IC1.

At the beginning of each weld, the capacitor C7 is initially charged to the supply voltage. To accomplish this, when the reed relay RR2 was energized to close its contacts RR2-1 (FIG. 1B), a transistor TR8 (FIG. 1A) was turned on to remove the supply voltage from the capacitor C7 by shunting the supply voltage. A diode D1 then prevented the capacitor C7 from discharging. As long as the capacitor C7 is at the supply voltage, the current source through the transistor TR9 and the corresponding transistors supply minimum current to the capacitors C3–C5, resulting in minimum welding current.

The transistor TR8 also lowers the gate bias of a programmable unijunction transistor PUT4 which turns on and causes the capacitor C7 to discharge through an up-slope control resistor R17. The capacitor C7 discharges at a rate determined by the resistor R17. During this time, the output of IC1 will decrease and charge current for C3–C5 will increase, resulting in increasing weld current. At some point during the discharge of the capacitor C7, the output of the integrated circuit IC3 (depending on the signal from the shunt S) will equal the voltage on the capacitor C7. At this time, no current will flow through the programmable unijunction transistor PUT4 and it will turn off. The voltage of capacitor C7 is then under the control of the integrated circuit IC3, and the integrated circuit IC1 in turn is controlled by the capacitor C7. Thus the up-slope control turns itself off.

When the charge on a capacitor C8 in the timer circuit (FIG. 1B) reaches the turn-on voltage of a programmable unijunction transistor PUT5, as determined by a voltage divider represented by resistors R18 and R19 and a variable resistor VR6, it causes current to flow through a primary of a pulse transformer PT4-P. The charging time for the capacitor C8 is determined by a resistor 20 and variable resistors VR7 and VR8. One of the resistors VR7 and VR8 is controlled by a dial on the control panel, along with the dial for the resistor VR4, to set the time for the welding cycle. When the primary of the pulse transformer PT4 is pulsed, its secondary PT4-S (FIG. 1C) turns on a silicon-controlled rectifier SCR14 which discharges a capacitor C9 across the silicon-controlled rectifier SCR1 to turn it off. The retraction coil RC is thereby deenergized and drops out. A short time later the reed relay RR2 drops out as determined by a capacitor C10 connected thereacross. The stud is then plunged against the workpiece to complete the weld. The reed relay RR3 is also deenergized when SCR1 is turned off, but stays on by virtue of capacitor C11. When the reed relay RR3 is deenergized, the contact RR3-1 to RR3-3 drop out. These are only needed when two welding tools are to be operated by the controls.

For overall safety, a reed switch RS1 on the weld cable energized a reed relay RR4 in the timer power supply of FIG. 1B when the weld begins. Contacts RR4-1 then close to start a timer PUT6 (FIG. 1B) for a given period such as 2 seconds. This turns on an SCR15 tripping a circuit breaker CB to shut off the power supply in the event the time is exceeded. A thermal switch TS1 also will close to shut off the power supply if a given maximum temperature is exceeded.

The circuit also includes a temperature monitoring control. When a temperature-sensing switch designated TS2 (FIG. 1A) is closed, a capacitor C12 is charged and a primary of a pulse transformer PT5 is pulsed if reed relay contacts RR4-2 are closed. This turns on a silicon-controlled rectifier SCR16 which turns on a signal light designated SL and also shunts the reed relay RR1 to prevent further welding until reset. The switch TS2 operates at a lower temperature then the thermal switch TS1.

Of course, various modifications of the above-described circuitry and specific components thereof can be made. For example, zener diodes and amplifying transistors can be employed in place of the integrated circuits. Also, pulse transformers can be employed in place of the photon couplers PHT1–PHT6 and SCR2–SCR7.

Various other modifications of the invention will also be apparent to those skilled in the art and such modifications are intended to be within the scope of the invention if they are within the spirit and the tenor of the accompanying claims.

I claim:

1. Apparatus for welding a stud to a workpiece comprising a multi-phase power supply, electrical means for withdrawing the stud from the workpiece when said means is energized, spring means for plunging the stud toward the workpiece when said electrical means is deenergized, means connected with said power supply, the stud, and the workpiece for supplying rectified power from said supply to the stud and the workpiece to establish a pilot arc therebetween, additional means connected with said power supply, the stud, and the workpiece for supplying rectified power to the stud and the workpiece for establishing a main welding arc therebetween, said additional means including a semi-conductor controlled rectifier for each phase of the power supply, phase control means for sequentially causing said semi-conductor controlled rectifiers to conduct at predetermined times relative to the cycles of the multi-phase power supply, said phase control means including independent means for firing each of said semi-conductor controlled rectifiers, and means for energizing said firing means including a shunt in a welding circuit for the welding current, means for receiving a signal from said shunt, and hand-manipulatable means for modulating said signal and for changing the times in the cycles of the power supply at which said firing means are energized, a timing circuit connected to said electrical means to deenergize said electrical means and to enable said spring means to plunge the stud toward the workpiece, hand-manipulatable means for controlling the actuation of said timing circuit to control the time in the welding cycle at which the electrical means is deenergized and the stud is plunged toward the workpiece, said firing means comprising capacitor means effective to cause said semi-conductor controlled rectifiers to conduct when a charge on said capacitor means reaches a given value, circuit means for controlling the charging rate of said capacitor means, and up-slope circuit means for supplying power to said circuit means.

2. Apparatus according to claim 1 characterized by flip-flop circuit means for discharging said capacitor means prior to each half cycle of each phase of the multi-phase power supply.

3. Apparatus for welding a stud to a workpiece comprising a three-phase power supply, means for establishing a pilot arc between the stud and the workpiece, means including a plurality of semi-conductor controlled rectifiers located in series with said power supply, the stud, and the workpiece for establishing a main welding arc between the stud and the workpiece, phase control means sequentially firing said semi-conductor controlled rectifiers to establish a constant main welding arc current even with fluctuations in the voltage of the three-phase power supply and changes in the resistance of the main welding arc circuit, said phase control means including weld current sensing means producing a signal responsive to the welding current, a circuit for receiving the signal, for comparing the signal with a constant signal and for producing a combined signal, means responsive to the combined signal for firing the semi-conductor controlled rectifiers during the cycles of the power supply in response to the combined signal received from said circuit, said means responsive to the combined signal comprising a capacitor for each phase of said power supply, and a flip-flop circuit for each of said capacitors, each flip-flop circuit discharging the corresponding capacitor prior to each half cycle of the corresponding phase of said three-phase power supply, and a sloped circuit for controlling the signal from said sensing means to said circuit.

4. Apparatus according to claim 5 characterized by means for discharging an up-slope capacitor of said up-slope circuit when the charge thereon equals the constant signal.

5. Apparatus for welding a stud to a workpiece comprising a three-phase power supply, means for establishing a pilot arc between the stud and the workpiece, means including a plurality of semi-conductor controlled rectifiers located in series with said power supply, the stud, and the workpiece for establishing a main welding arc between the stud and the workpiece, phase control means sequentially firing said semi-conductor controlled rectifiers to establish a constant main welding arc current even with fluctuations in the voltage of the three-phase power supply and changes in the resistance of the main welding arc circuit, said phase control means including weld current sensing means producing a signal responsive to the welding current, a circuit for receiving the signal, for comparing the signal with a constant signal and for producing a combined signal, means responsive to the combined signal for firing the semi-conductor controlled rectifiers during the cycles of the power supply in response to the conbined signal received from said circuit, said means responsive to the combined signal comprising a capacitor for each phase of said power supply, and a flip-flop circuit for each of said capacitors, each flip-flop circuit discharging the corresponding capacitor prior to each half cycle of the corresponding phase of said three-phase power supply, and an up-slope circuit for supplying increasing voltage to said circuit from the beginning of the weld cycle until the constant signal is reached.

6. Apparatus for welding a stud to a workpiece comprising a multi-phase current power supply, rectifying and switch means connected with said power supply, the stud, and the workpiece for supplying rectified power between the stud and the workpiece to establish a pilot arc therebetween, additional switch means connected with said power supply, the stud, and the workpiece for supplying rectified power between the stud and the workpiece to establish a main welding arc therebetween with said additional switch means including a semi-conductor controlled rectifier for each phase of the power supply located in series with the power supply, the stud, and the workpiece, and phase control means for sequentially causing said semi-conductor controlled rectifiers to conduct in sequence and at predetermined times relative to the cycles of the multi-phase power supply, said phase control means comprising means for each phase of the power supply for firing the semi-conductor controlled rectifiers, a capacitor connected with each of said firing means, flip-flop transistor means for each of said capacitors for discharging the capacitors prior to each half cycle of the associated phase of the multi-phase current power supply, said firing means comprising a programmable unijunction transistor for each of said semi-conductor controlled rectifiers, said phase control means further including a shunt in a welding circuit which is electrically connected to the stud, means for supplying a voltage signal across said shunt to said capacitors to control the rate of charging thereof, amplifying means between said shunt and said capacitors, capacitor means for controlling the output of said amplifying means, said amplifying means comprising a circuit capable of producing an output voltage, an up-slope capacitor for supplying voltage to said circuit, and means for connecting said up-slope passage to said power supply.

7. Apparatus according to claim 6 characterized by means for disconnecting said up-slope capacitor from said power supply when the voltage on said up-slope capacitor equals the output voltage of said circuit.

8. Apparatus according to claim 7 characterized by said disconnecting means comprising an additional programmable unijunction transistor connected with said up-slope capacitor which causes said up-slope capacitor to discharge when said additional programmable unijunction transistor is turned on.

* * * * *